United States Patent [19]

Flaherty

[11] Patent Number: 5,078,093
[45] Date of Patent: Jan. 7, 1992

[54] AQUARIUM WITH AN INTERNAL DISPLAY DEVICE FOR PICTURE

[75] Inventor: Daniel G. Flaherty, Irving, Tex.

[73] Assignee: Gemmy Industries Corporation, Irving, Tex.

[21] Appl. No.: 497,014

[22] Filed: Mar. 20, 1990

[51] Int. Cl.⁵ .............................................. A01K 64/00
[52] U.S. Cl. ............................................ 119/5; 40/649
[58] Field of Search ............... 119/5; 40/152.1, 661, 40/649, 406, 152; D30/101, 102, 103, 104, 105, 106, 107

[56] References Cited

U.S. PATENT DOCUMENTS

| | | | |
|---|---|---|---|
| 460,810 | 10/1881 | Gunther | 119/5 |
| 1,263,391 | 4/1918 | Eickemeyer | 119/5 |
| 1,991,683 | 2/1935 | Kelly | 119/5 |
| 2,814,895 | 12/1957 | Flam | 119/5 |
| 3,086,658 | 4/1963 | Palmer | 40/152.1 |
| 3,119,371 | 1/1964 | Zuckerman | 119/5 |
| 3,288,110 | 11/1966 | Goldman et al. | 119/5 |
| 3,291,098 | 12/1966 | Halpert | 119/5 |
| 3,618,238 | 11/1971 | Willinger | 40/661 |
| 3,956,837 | 5/1976 | Itano | 40/152.1 |
| 4,120,265 | 10/1978 | Davis | 119/5 |
| 4,136,638 | 1/1979 | Fedor | 119/5 |
| 4,144,664 | 3/1979 | De Korte | 40/152.1 |
| 4,687,575 | 7/1987 | Grose | 119/5 |
| 4,837,955 | 6/1989 | Grabhorn | 40/661 |

FOREIGN PATENT DOCUMENTS 0791000  2/1958  United Kingdom ..................... 119/5

Primary Examiner—Robert P. Swiatek
Assistant Examiner—Todd E. Manahan
Attorney, Agent, or Firm—Gerard F. Dunne

[57] ABSTRACT

A display device for a picture includes an aquarium having upstanding side walls, a closed bottom and an open top. A cover member is provided over the open top and has a slot for receiving a picture such as a photograph. A water-tight member depends from the slot in the cover member, and the water-tight member is formed of a transparent material so as to be able to receive the picture to display it within the aquarium.

7 Claims, 4 Drawing Sheets

AQUARIUM WITH AN INTERNAL DISPLAY DEVICE FOR PICTURE

The present invention relates to an aquarium which has an internal device to display a picture such as a photograph within the aquarium.

It has been proposed to include a picture in combination with an aquarium or fish tank, and generally such proposals have included structures for mounting a picture directly to the backside of an aquarium. Note, for example, the structure disclosed in U.S. Pat. No. 1,991,683 to Kelly and U.S. Pat. No. 3,119,371 to Zuckerman. These pictures, however, are mounted on the exterior surface of the aquarium and present only an illusion of a picture within the aquarium.

A proposal has been made to indent the rear side wall of the aquarium so as to mount a picture more interiorly of the aquarium. However, such constructions are often difficult to manufacture in order to assure that the indentation formed in the backside wall of the aquarium will remain water-tight. Further, such constructions do not serve effectively to position a picture within the aquarium for viewing from the rear side.

It is, therefore, an object of the present invention to provide an aquarium having internal structures for displaying a picture such as a photograph within the aquarium which do not need extensive manufacturing techniques in order to assure that the aquarium will remain water-tight, and display a picture from more than one direction.

According to the present invention, a display device for a picture includes an aquarium having upstanding side walls, a closed bottom and an opened top. A cover member is held over the open top and has a slot for receiving a picture. Depending from the slot in the cover member is a water-tight member formed of a transparent material which is adapted to receive the picture to display it interiorly of the aquarium.

These and other features of the present invention will become more apparent from a review of a preferred embodiment of the present invention described in connection with the accompanying drawings, in which.

Figure 1:
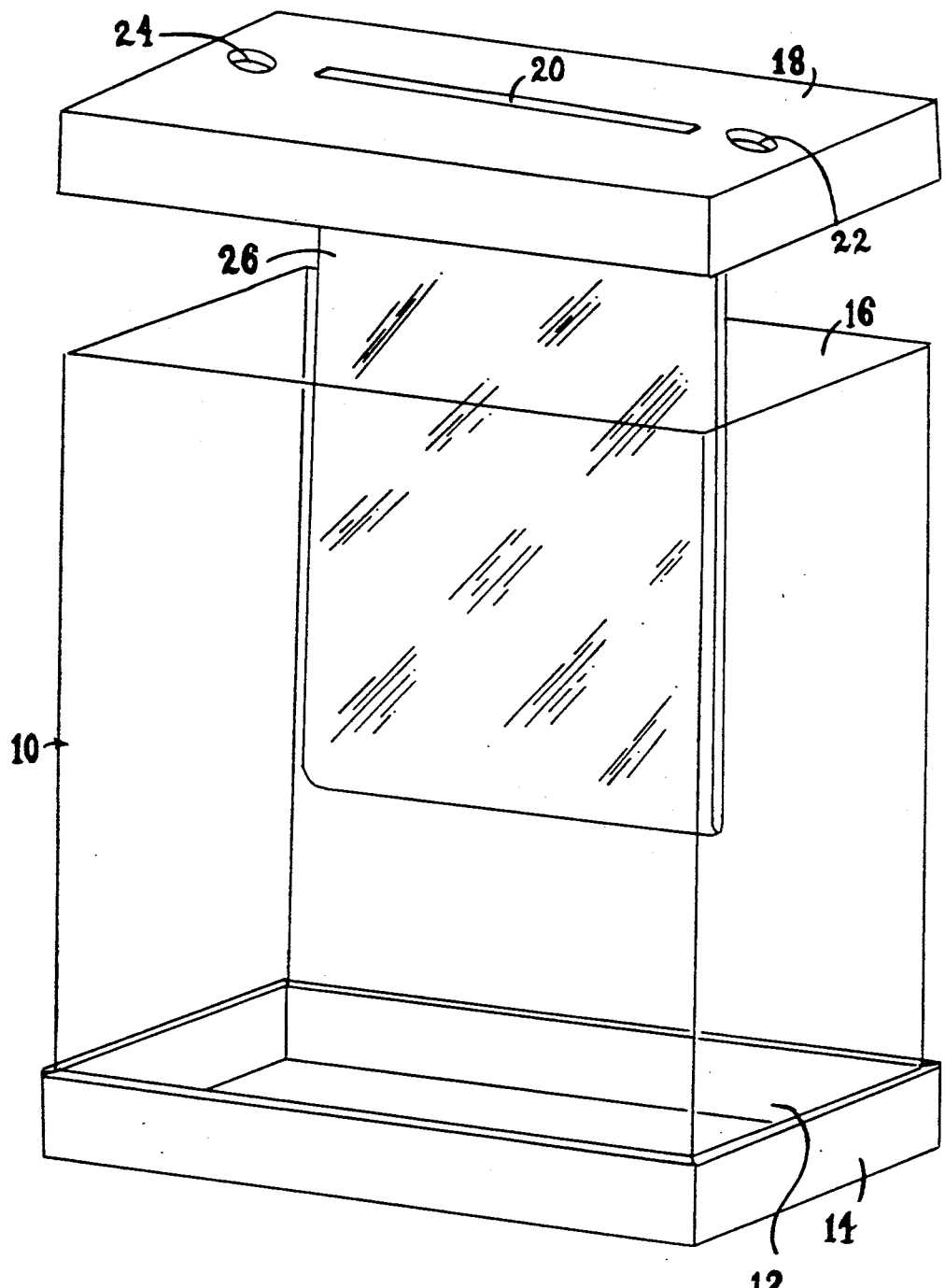
FIG. 1 is a prospective view of an aquarium having the display device of the present invention.

According to the present invention, an aquarium 10 has side wall 12 upstanding from a closed bottom member 14 fitted to the side walls; and the aquarium has an open top 16.

A cover member 18 is adapted to fit over the open top 16 of the aquarium, and the cover member 18 includes a central slot 20. Additionally, the cover member 18 includes openings 22 and 24 positioned in the cover member 18.

Figure 2:
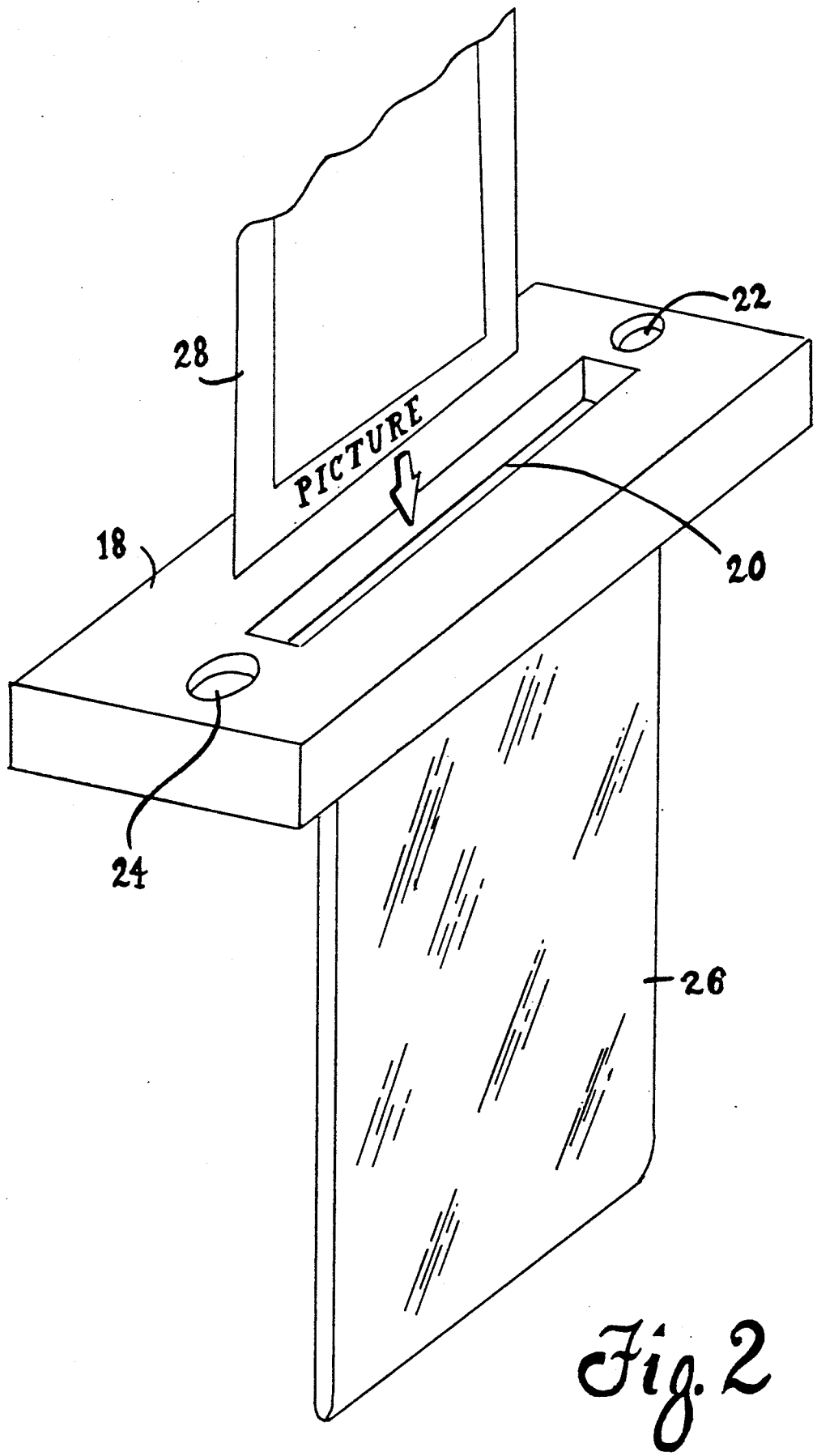
FIG. 2 is a prospective view of the cover member of the present invention.

Depending from the slot 20 is a water-tight member 26 having a central slot for receiving a picture 28 as illustrated in FIG. 2.

The water-tight member 26 is formed of a transparent synthetic material, and preferably is molded integrally with the cover member 18.

The water-tight member 26 has a central cavity formed by its central slot which is wide enough to receive, if desired, two pictures back-to-back so that a respective picture or photograph can be viewed from the front and rear side of the aquarium.

Figure 3:
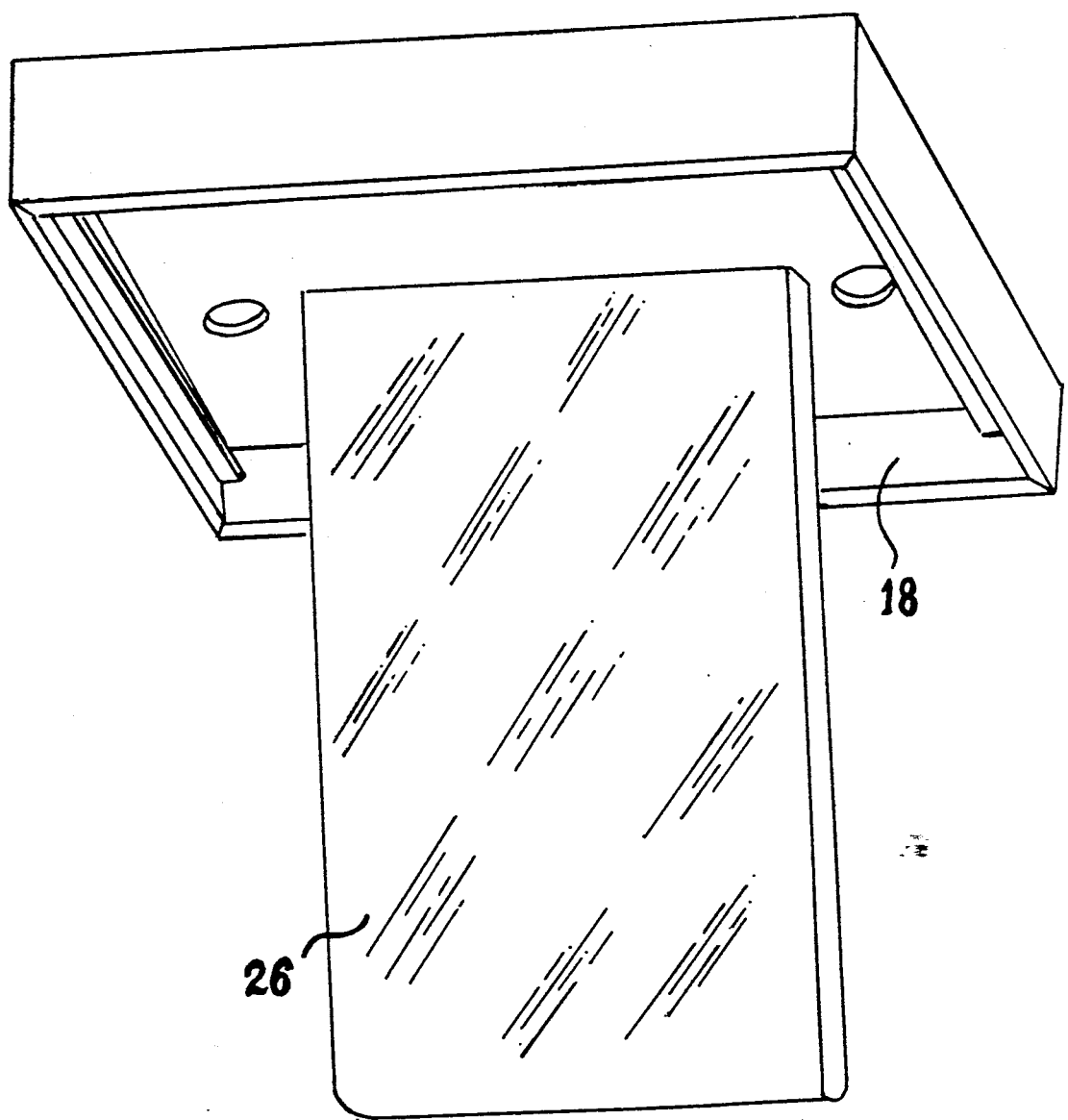
FIG. 3 is a prospective view showing the underside of the cover member thereof.

Illustrated in FIG. 3 is the under side of the cover member 18, and the cover member is designed to fit down over the open top 16 of the aquarium 12, and the weight of the depending water-tight member 26 has been found sufficient to prevent the cover member 18 from floating upwardly when water is added to the aquarium. However, if necessary, the cover member 18 can be designed to snap snuggly over the open top 16 of the aquarium to assure the cover member 18 will not be floated upwardly when the aquarium is filled with water.

Figure 4:
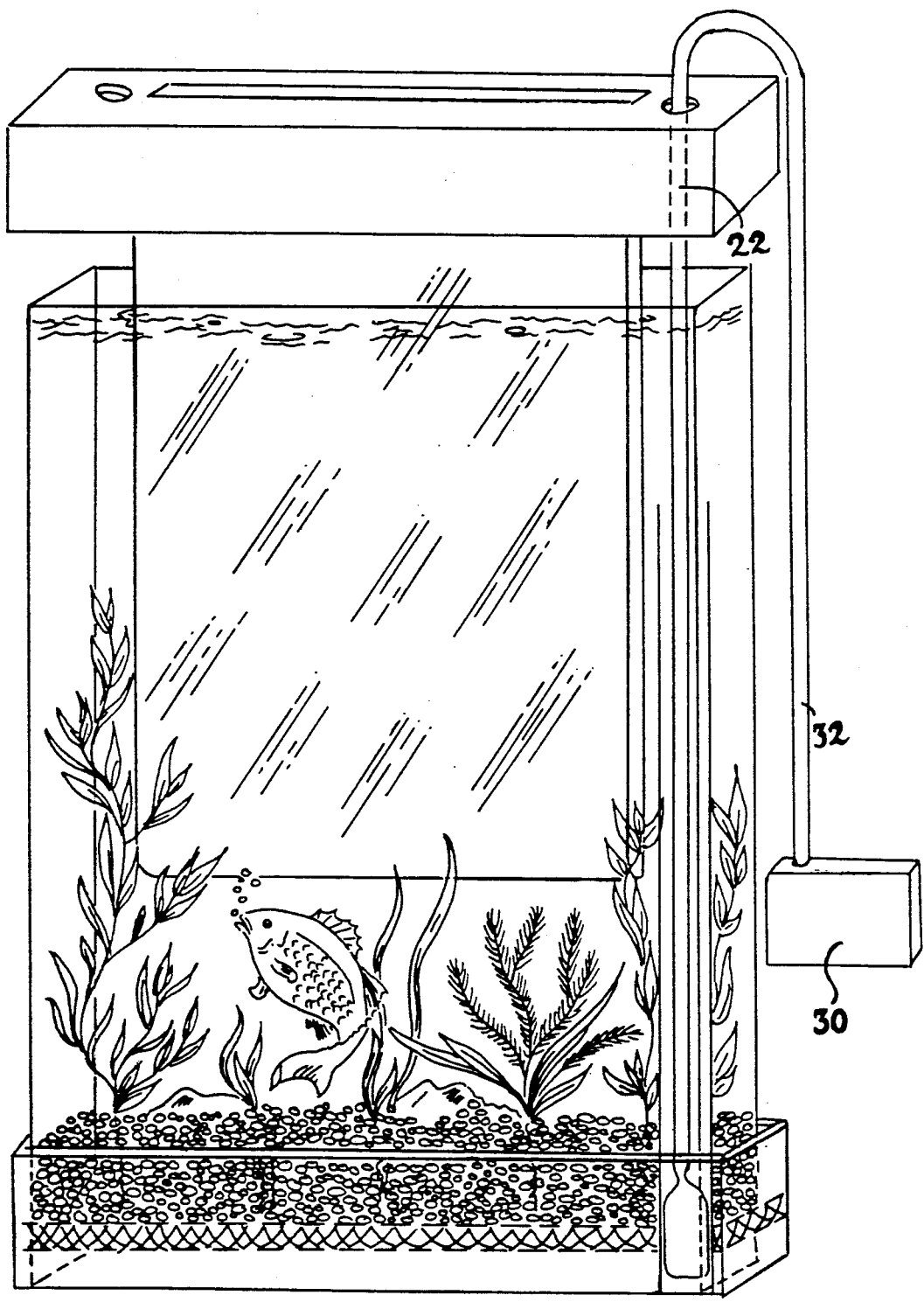
FIG. 4 illustrates an aquarium with the display device fitted there within.

As shown in FIG. 4, an air pump 30 with a connecting hose 32 is fitted within the aquarium by being placed through opening 22; and the openings 22 and 24 will serve to release air pressure as the cover member is fitted down tightly over the open top 16.

The invention has been described with reference made to a preferred embodiment, and is understood that the details of the present invention are not intended to be limited by the details of the preferred embodiment; but are defined by the appended claims.

I claim:

1. A display device for a picture including an aquarium having upstanding side walls, a closed bottom and an open top; and a cover member adapted to be held over the open top and having a narrow slot therein for receiving a picture, and means including a water-tight member depending from said slot and formed of a transparent material for holding said picture in a substantially upright position to display it interiorly of the aquarium.

2. A display device as set forth in claim 1, wherein said water-tight member is formed integrally with said cover member.

3. A display device as set forth in claim 1, wherein said cover member has an opening for venting air.

4. A display device adapted to fit within an aquarium having upstanding side walls and an open top, said display device including a cover member adapted to be held over the open top of the aquarium and having depending therefrom means for holding a picture to display such picture interiorly within the aquarium in a substantially upright position.

5. A display device as set forth in claim 4, wherein said means for receiving a picture includes a narrow slot, and a water-tight member depending from said slot and formed of a transparent material to display the picture interiorly of the aquarium.

6. A display device set forth in claim 5, wherein said water-tight member is formed integrally with said cover member.

7. A display device as set forth in claim 5, wherein said cover member has an opening for venting air.

* * * * *